A. T. MOORE.
FISH HOOK.
APPLICATION FILED APR. 3, 1919.
1,307,411.
Patented June 24, 1919.
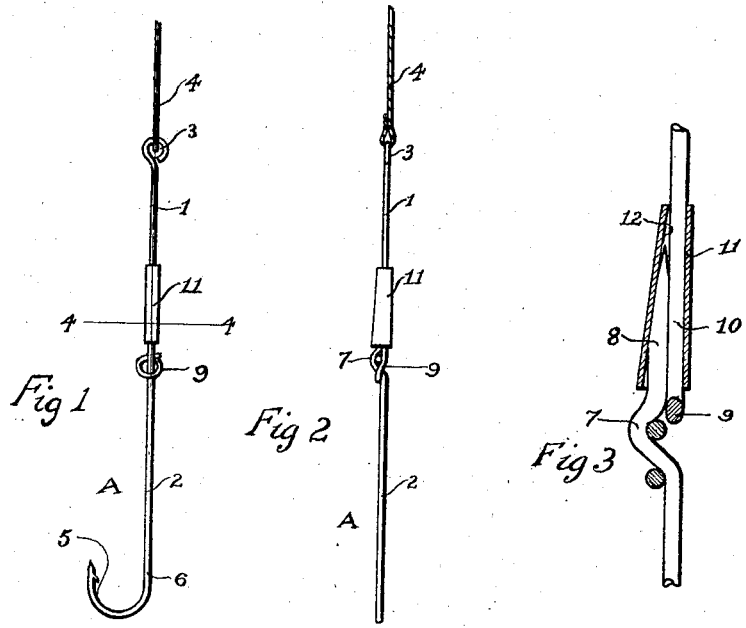
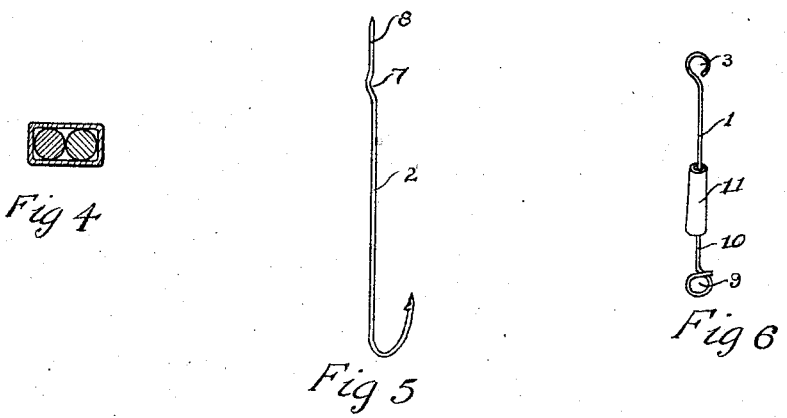
Inventor
Albert T. Moore
By
C. C. Shepherd
Attorney

UNITED STATES PATENT OFFICE.

ALBERT T. MOORE, OF COLUMBUS, OHIO.

FISH-HOOK.

1,307,411.  Specification of Letters Patent.  Patented June 24, 1919.

Application filed April 3, 1919. Serial No. 287,247.

*To all whom it may concern:*

Be it known that I, ALBERT T. MOORE, a citizen of the United States, residing at Columbus, in the county of Franklin and State of Ohio, have invented certain new and useful Improvements in Fish-Hooks, of which the following is a specification.

This invention relates to fish hooks, and is particularly directed to an improved hook wherein features of construction are provided to facilitate its baiting, and to largely reduce the element of physical injury hitherto involved in this operation.

Another object of the invention resides in a fish hook which is so constructed as to permit the bait to be inserted thereon from its end opposite to its hooked extremity, this being done in order to preserve the general condition of the bait, by preventing the same from being mutilated by said extremity, and to relieve the user of the necessity of fingering the hooked or pronged extremity.

A further object resides in a fish hook composed substantially of two members, the upper of which being permanently attached to the end of a line structure and the other detachably connected with the line carried member, whereby the lower member may be removed from the line to facilitate the removal of a snared fish from the hook and to render the rebaiting of the hook a simple and easy matter.

A still further object resides in the peculiar form of joint structure for separably uniting the adjoining ends of the pair of members comprising the hook, said joint being of hook and eye formation which when assembled is locked against displacement by virtue of a slidable sleeve, the latter being formed so that when embracing the joint the members will be rigidly united and the separation thereof in any direction effectively prevented.

With these and other objects in view, as will appear as the description proceeds, the invention accordingly consists in the novel features of construction, combination of elements and arrangement of parts hereinafter more fully described and having the scope thereof pointed out in the appended claims.

In the accompanying drawing:

Figure 1 is a side elevation of the fishing hook comprising the present invention, Fig. 2 is an edge elevation thereof, Fig. 3 is an enlarged vertical sectional view taken through the joint of the hook, Fig. 4 is a horizontal sectional view taken along the line 4—4 of Fig. 1, Fig. 5 is a detail perspective view of one of the hook members, and Fig. 6 is a detail perspective view of the other member.

Similar characters of reference denote like and corresponding parts throughout the several views of the drawing.

The fish hook A comprising the present invention consists preferably of a plurality of separably united members, the upper or the line attaching member being indicated by the numeral 1, and the lower or hook member being designated by the numeral 2. The member 1 has its upper end formed with an eye 3, by means of which the end of a fishing line 4 may be readily secured thereto, this construction serving to render the member 1 a permanent part of the line structure.

The lower member 2 is provided with the usual hook extremity 5 which may be pronged or shaped in any desired manner. The lower member is further provided with a vertically extending shank 6 of any desired length, and which is provided adjacent to its upper end with a bend or hook 7, which terminates upwardly in a vertical extremity 8 disposed substantially in vertical alinement with the body of the shank 6, thereby offsetting the bend or hook 7 from the main plane of said shank. This hook or bend 7 is adapted to be received within an eye 9 formed on the lower end of the member 1, and the extremity 8 is designed to lie parallel with and meet adjacent to the shank 10 of said upper member. To hold the extremity 8 in contact with the shank 10, and to thereby rigidly unite the members 1 and 2, use is made of a slidable sleeve 11, which is mounted for reciprocation upon the shank 10 of the upper member. This sleeve is formed to embody a tapering bore 12 which is appreciably larger at its lower end than at its upper end, in order that the bore 12 may readily receive the extremity 8 without any difficulty and which will press the extremity 8 into firm and bound contact with the shank 10.

It will thus be manifest that when the sleeve 11 is clamped down upon the extremity 8 the latter will be immovably united with the upper member 1, and since it is impossible to oscillate the extremity 8, it will be accordingly impossible to draw the same through the eye 9 to effect the disengagement or separation of the lower member 2 from the line carried member. It will be noted that when the joint is rigidly formed, that the bend or hook 7 will substantially contact with the upper and lower convolutions of the eye 9, so that when tensile stress is imparted to the hook, the same will be absorbed by the two points of engagement of the hook 7 with the adjoining portions of the eye 9, thus rendering the hook exceptionally substantial in construction and serving to effectively prevent its undue separation. By tapering the bore 12, the sleeve 11 will be capable of operatively engaging with the lower members 2 of different proportions, since, owing to the gradually decreasing diameter of the bore, will be enabled to frictionally grip extremities 8 of varied diameters or lengths. To release the lower member 2 from engagement with said upper member, it is simply necessary to slide the sleeve 11 upwardly upon the shank 10 until the same is freed from engagement with the extremity 8. When this is accomplished the lower member may be oscillated so that its hooked portion 7 will readily pass through the eye 9, thus completing the separation of said members. In assembling the members it will of course be understood that this operation is reversed.

The hook described has many advantages over the common form of fishing hook. In the first place, by disconnecting the lower member from the upper member it is possible to bait the hook by inserting the bait or by placing the same over the extremity 8 and thence down upon the shank 6 into cooperation with the hook extremity 5. This feature has the advantage of maintaining the bait in a well preserved condition, since in placing the bait upon the hook the same is not mutilated by the prongs of the extremity 5. This has the effect of securely locating the bait upon the hook so that the same can not readily slip off and to thereby cause unnecessary rebaiting. The slipping off of the bait it is obvious is prevented by the prong of the extremity 5, which arrests outward movement on part of the bait, which owing to its non-mutilated condition will not be capable of passing over the prong of the hook. Again, by inserting the bait upon the hook by way of the extremity 8, the fingers of the user will not be brought into contact with the extremity 5, thus minimizing the element of physical injury hitherto largely involved in hook baiting. The lower member is so constructed that the same may be readily removed from joined relation with the upper member. This enables a fisherman to carry a number of the lower members in a baited condition, so that when a fish has been caught, the lower member 2 together with the fish may be disconnected from the line 4, and a fresh baited lower member may then be readily inserted upon the line, thus minimizing the period of time usually taken up in disconnecting a fish from the hook and in rebaiting the latter. This feature is particularly advantageous when fish are swimming in schools, and also, by not removing the lower member from the snared fish, the latter is maintained in an alive condition much longer than if the hook had been removed and blood vessels broken thereby. In summary, the invention provides a hook which may be easily and safely baited, convenient to remove from an associated line and of such construction as to permit a line to be very quickly rebaited.

What I claim is:

1. A fish hook comprising a two part structure formed to include a lower bait receiving member and an upper line attaching member, said lower member having the upper end of its shank formed with a hook, which latter terminating upwardly in an extremity located in substantially vertical alinement with the main shank of said lower member, an eye formed upon the lower end of said upper member for the reception of said hook, and a sleeve slidably mounted upon the shank of the upper member and arranged to fit over the upper extremity of said lower member to retain said hook in locked relation with said eye, whereby separating movement on part of said members will be prevented during the engagement of said sleeve with said extremity.

2. A fish hook comprising a two part structure formed to include an upper line carried member and a depending detachable bait receiving member, a connecting joint for said members, wherein the adjoining end of one of said members is formed with a hook which terminates in a substantially straight extremity, an eye formed upon the adjoining end of the other of said members and arranged to receive said hook, and a sliding element arranged upon one of said members to lock the joint to prevent undue separating movement on part of said members, said joint being such that upon the placing of stencil stress thereon said hook will contact with both the upper and lower portions of said eye.

3. A fish hook comprising a two part structure formed to include an upper line carried member and a lower bait receiving hook member, a joint for separably uniting said members, including an eye formed upon the lower end of said line carried member, a bend formed in the upper end of said bait receiving member to be received within said eye, said bend terminating in a substantially straight extremity disposed to lie parallel with the shank of said upper member, a sleeve carried upon said upper member and arranged to fit over said extremity to hold the latter in bound relation with said upper member, and said sleeve being provided with a tapering bore to accommodate the same to lower members of varying proportions.

In testimony whereof I affix my signature.

ALBERT T. MOORE.